Jan. 31, 1950

B. D. LOUGHLIN 2,495,938

SIGNAL GENERATOR

Filed June 7, 1947

2 Sheets-Sheet 1

INVENTOR.
BERNARD D. LOUGHLIN

BY John A. Harvey

ATTORNEY

Jan. 31, 1950

B. D. LOUGHLIN

SIGNAL GENERATOR 2,495,938

Filed June 7, 1947

2 Sheets-Sheet 2

INVENTOR.
BERNARD D. LOUGHLIN

BY John A. Harvey

ATTORNEY

Patented Jan. 31, 1950

2,495,938

UNITED STATES PATENT OFFICE 2,495,938

SIGNAL GENERATOR

Bernard D. Loughlin, Lynbrook, N. Y., assignor to Hazeltine Research, Inc., Chicago, Ill., a corporation of Illinois Application June 7, 1947, Serial No. 753,238

14 Claims. (Cl. 250—36)

Figure 1:
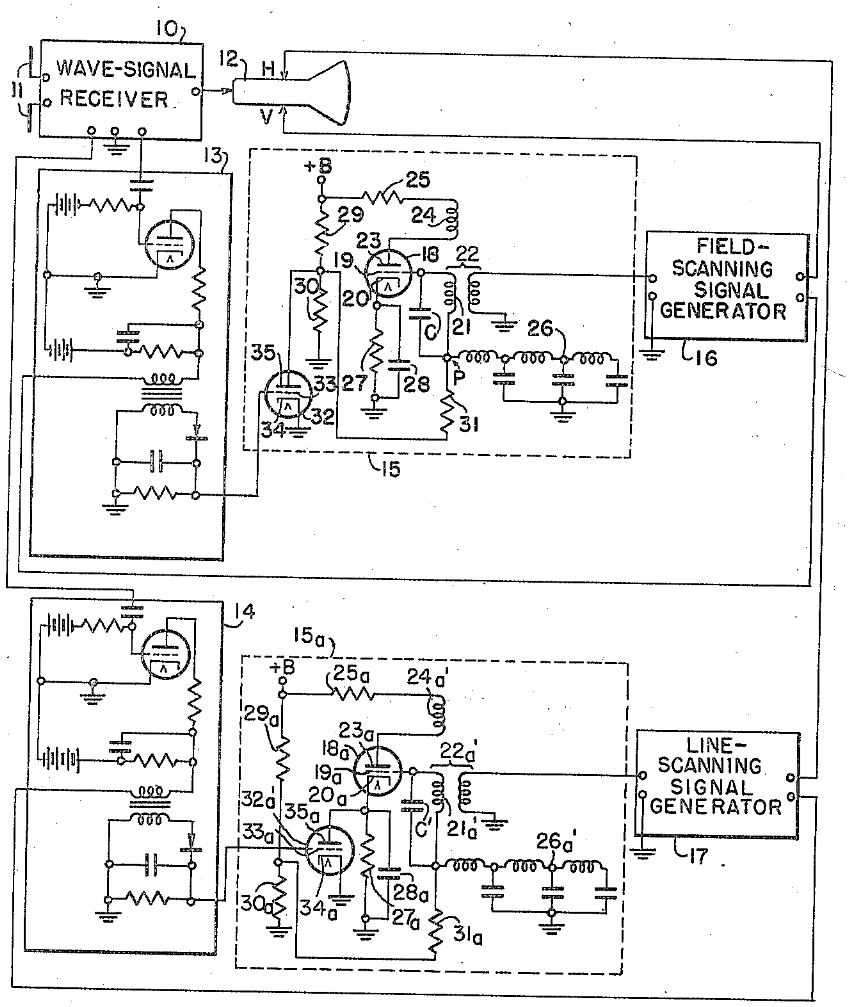

The present invention relates to signal generators and, particularly, to such generators of the so-called blocking-oscillator type for generating a signal of repeated-pulse wave form. While the invention is of general application, it is particularly suited for use in connection with the generation of scanning currents or voltages of a television receiver and will be described in that connection.

It is frequently desirable to provide a signal generator having an operating frequency highly stabilized against variations of operating conditions to which the generator is normally subjected in operation, for example, against variations of oscillator tube characteristics or variations of the values of one or more energizing potentials or circuit components. An illustrative application is in a television receiver which includes an automatic-phase-controlled synchronizing system wherein the field-scanning and line-scanning generators thereof have individual operating frequencies but are controlled to have a phase synchronized with field-synchronizing and line-synchronizing pulse components of a received television signal. The best and most desirable phase-control action is effected when the phase-control system is able to take control and maintain phase synchronization of a controlled scanning generator only over a rather limited range of phase deviations from synchronism. Therefore, as long as these generators have a natural operating frequency quite near the desired field-scanning and line-scanning frequencies, it is not difficult for the phase-control system to maintain the desired synchronization of their operation. In practice, however, these scanning signal generators heretofore proposed do not usually exhibit unduly high frequency stability. This is particularly true during periods of warm-up immediately following the moment when the television receiver is placed in operation or during periods when the energization of the generator may experience substantial fluctuations in value for one reason or another. Frequency instability may result in complete loss of phase control or may cause a rather sluggish and disagreeable control action requiring an appreciable interval for the phase-controlled synchronization to be effected.

It is an object of the present invention, therefore, to provide a new and improved signal generator which avoids one or more of the limitations and disadvantages of prior such generators.

It is a further object of the invention to provide a new and improved signal generator characterized by an exceptionally high frequency stability and one particularly suitable for phase-controlled operation.

It is an additional object of the invention to provide a new and improved signal generator, adapted to generate a signal of repeated-pulse wave form, which possesses stable operating characteristics over a wide range of variations of operation conditions to which the generator is normally subjected in operation.

It is a further object of the invention to provide a signal generator of simplified, inexpensive, and improved circuit arrangement involving a minimum of circuit components.

In accordance with a particular form of the invention, a signal generator comprises an oscillatory system for generating oscillations, the system including an energizing circuit in which the energizing current thereof is effectively of repeated-pulse wave form, and means for maintaining substantially constant the durations of the pulses of the energizing current and for limiting the amplitudes thereof. The generator includes means responsive to the unidirectional component of the energizing current yet having much less response to the pulse-periodicity component thereof for controlling the oscillatory system to maintain a controlled relationship between the average value of the energizing current and the average value of the energizing potential of the energizing circuit, thereby to maintain substantially constant the periodicity of the generated oscillations.

For a better understanding of the present invention, together with other and further objects thereof, reference is had to the following description taken in connection with the accompanying drawings, and its scope will be pointed out in the appended claims.

Figure 2:
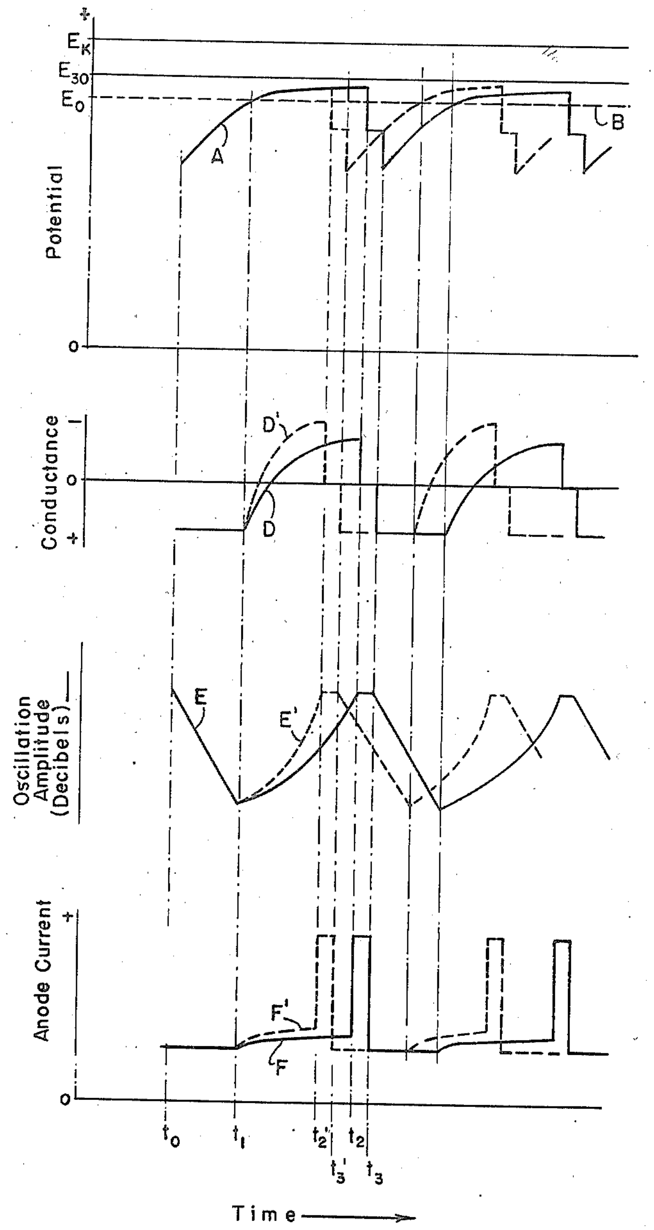

Referring now to the drawings, Fig. 1 is a circuit diagram, partly schematic, representing a complete television receiver which includes signal generators embodying the present invention in a particular form; and Fig. 2 graphically represents certain operating characteristics of the generator of the invention and is used as an aid in explaining its operation.

Referring now more particularly to Fig. 1 of the drawings, the television receiver includes a wave-signal receiver 10 having an input circuit coupled to an antenna system 11. It will be understood that the unit 10 includes in conventional manner one or more stages of wave-signal amplification, an oscillator-modulator and one or more stages of intermediate-frequency amplification if desired, a wave-signal detector for deriving the image-modulation components of a received television signal, means for deriving and separating the synchronizing-signal components of the television signal, and one or more stages of video amplification for amplifying the derived image-modulation components. The video output circuit of the unit 10 is coupled in conventional manner to an intensity-control electrode of a cathode-ray type of image reproducer 12. The television receiver also includes a field-scanning phase-control system 13 and a line-scanning phase-control system 14 each of which is shown by way of example as of the type disclosed and claimed in the United States Reissue Patent No. 22,055 granted March 24, 1942 to Pierre Marie Gabriel Toulon, entitled "Synchronization system for television," and assigned to the same assignee as the present application. The arrangement of the phase-control system 13 is shown as it appears in the Toulon patent and includes an input circuit coupled to the output circuit of the field synchronizing-signal separator arrangement of the unit 10 and a unidirectional control-signal output circuit coupled to a signal generator 15 more fully described hereinafter. The output circuit of the latter unit is coupled to a control circuit of a field-scanning signal generator 16 which may be of any conventional type having an operation synchronized by a synchronizing signal of pulse wave form applied thereto. The output circuit of the generator 16 is coupled to the vertical-deflecting electrodes V of the reproducing tube 12. The phase-control system 14 likewise has an input circuit coupled to the output circuit of the line synchronizing-signal separator arrangement of the unit 10 and has a control-signal output circuit coupled to a signal generator $15_a$, which is essentially similar to the signal generator 15 and will be described more fully hereinafter. The output circuit of the generator $15_a$ is coupled to a control circuit of a line-scanning signal generator 17, the output circuit of which is coupled to the horizontal-deflecting electrodes H of the reproducing tube 12. As required in the aforementioned Toulon synchronization system, an output circuit of the signal generator 16 is coupled to another input circuit of the phase-control system 13 and an output circuit of the signal generator 17 is similarly coupled to another input circuit of the phase-control system 14.

It will be understood that the various units just described may, with the exception of the signal generators 15 and $15_a$, be of a conventional construction and operation the details of which are well known in the art, rendering detailed description thereof unnecessary. Considering briefly the operation of the television receiver as a whole, and neglecting for the moment the operation of the signal generators 15 and $15_a$ presently to be described, a desired image-modulated wave signal is received and amplified by the wave-signal receiver 10 and the image-signal and synchronizing-signal modulation components are derived by the detector thereof. The image components are, in turn, amplified in the video amplifier of the unit 10 and are applied to the intensity-control electrode of the image reproducer 12 to modulate the cathode-ray beam thereof. The synchronizing-signal components derived by the detector of the unit 10 are separated from the image-signal components, and the field-synchronizing and line-synchronizing signals are separated from each other and applied to the respective phase-control systems 13 and 14. The detailed operation of the units 13 and 14 is fully explained in the aforementioned Toulon patent and will not be repeated here. Suffice it to say that each of these units develops an output unidirectional signal having a value varying with deviations of phase of the scanning signal relative to the synchronizing-signal components applied thereto. The output signal of the phase-control system 13 controls the phase of the oscillations generated by the signal generator 15 which in turn controls the phase of the field-scanning signal generated by the generator 16. The output signal of the phase-control system 14 similarly controls the phase of the oscillations generated by the signal generator $15_a$ which in turn controls the phase of the line-scanning signal generated by the generator 17. The field-scanning generator 16 generates and applies a scanning signal of saw-tooth wave form to the field-scanning electrode V of the image reproducer 12 while the line-scanning generator 17 applies a scanning signal of saw-tooth wave form to the line-scanning electrodes H thereof, thereby to deflect the cathode-ray beam of the image reproducer 17 in two directions normal to each other visually to reproduce the received television image.

Referring now more particularly to the portion of the receiver embodying the present invention, the signal generator 15 comprises an oscillatory system for generating oscillations. This system includes a controllable-transconductance vacuum tube 18 having input electrodes included in an input circuit and output electrodes included in an energizing circuit regeneratively coupled to the input circuit. In particular, the tube 18 includes a control electrode 19 and a cathode 20 coupled to an input circuit comprising a first winding 21 of a transformer 22, and includes an anode 23 coupled with the cathode 20 in an energizing circuit comprising a second transformer winding 24 regeneratively coupled to the winding 21. The winding 21 is tuned by a condenser C to a frequency much higher than the frequency of the oscillations generated by the generator 15.

The energizing current of the vacuum tube 18 is of repeated-pulse wave form and the generator 15 includes means for maintaining substantially constant the durations of the pulses of the energizing current and for limiting the amplitudes thereof. The portion of this means which effects limiting of the amplitudes of the pulses of the energizing current comprises a resistor 25 serially included in the energizing circuit of the vacuum tube 18 and having a value of resistance much larger than the remaining impedance of the energizing circuit during a pulse of the energizing current. In particular, the resistor 25 is serially included between the transformer winding 24 and a source of energizing potential, indicated as +B. The other portion of the means last mentioned, namely that for maintaining substantially constant the durations of the pulses of the energizing current, comprises means responsive to the initiation of each pulse of the current for terminating each pulse after a predetermined fixed time interval. In particular, this means comprises a delay network 26, open circuited at its remote end and having a predetermined fixed time delay establishing the energizing-current pulse duration, coupled between the low-potential terminal of the transformer winding 21 and ground.

The signal generator 15 also includes means responsive to the unidirectional component of the energizing current yet having much less response to the pulse-periodicity component thereof for controlling the oscillatory system to maintain a controlled relationship between the average value of the energizing current and the average value of the energizing potential +B of the energizing circuit, thereby to maintain substantially constant the periodicity of the oscillations generated by the signal generator 15. This means comprises a time-constant or resistive-capacitive network comprising a resistor 27 and parallel-connected condenser 28 included in the cathode circuit of the vacuum tube 18. As thus arranged, the network 27, 28 degeneratively couples the input and energizing circuits of the oscillatory system with respect to the unidirectional component of the energizing current yet providing no appreciable coupling between the circuits with respect to the pulse-periodicity component thereof. The time-constant network 27, 28 in particular has a time constant short with relation to undesired variations of the unidirectional component of the energizing current yet long with relation to the pulse-periodicity component thereof. It is effective to derive a control effect or unidirectional control bias which is so applied to the input circuit of the oscillatory system as to control the transconductance of the vacuum tube 18 to maintain a desired substantially constant relationship between the average value of energizing current and the average value of energizing potential.

The control bias developed across the network 27, 28 from the average value of the energizing current is much larger than that required in the input circuit of the oscillatory system to bias the vacuum tube 18 to anode-current cutoff. The generator 15 also includes means responsive to the energizing potential +B of the energizing circuit for applying to the input circuit a bias potential having a value to provide with the bias developed across the network 27, 28 a normal operating bias for the input circuit yet a resultant bias which varies with the value of the energizing potential +B. This means comprises a potential divider having a first resistor 29 and a second resistor 30 coupled in series across the source of energizing potential +B with the junction of the resistors 29 and 30 coupled through a resistor 31 and through the transformer winding 21 to the control electrode 19 of the vacuum tube 18.

The generator 15 also includes means for adjusting the value of the bias provided by the means last described to vary the relationship between the energizing current and the energizing potential, thereby to adjust to a desired value the periodicity of the generated oscillations. This means comprises a vacuum tube 32 having a control electrode 33 and cathode 34 coupled to the output circuit of the phase-control system 13 and having an anode 35 coupled with the cathode 34 across the resistor 30 of the potential divider.

Considering now the operation of the signal generator just described, and referring to the curves of Fig. 2, it will be assumed at the outset that the oscillatory system at time $t_0$ is at a point in its operating cycle where the energizing or the anode current of the vacuum tube 18 has just ceased to flow. The potential of the point P at the junction of the resistor 31, the delay network 26, and the transformer winding 21 has at the time $t_0$ a relatively low value and thereafter increases in value as the network 26 charges exponentially through the resistor 31 toward the value of positive potential $E_{30}$ developed across the voltage divider resistor 30. The manner of potential variation of this point is represented by curve A. It is assumed that previous cycles of operation of the oscillatory system have caused a value of potential $E_K$ to be developed across the cathode resistor 27 and condenser 28 from the average value of anode current of the vacuum tube 18. The broken-line curve B of Fig. 2 represents the cutoff bias $E_0$ of the vacuum tube 18; that is, the bias applied to the control electrode 19 of the vacuum tube 18 and of value sufficiently less than the cathode bias $E_K$ that the anode current of the tube 18 just ceases to flow. It is apparent that the resultant bias applied at any given time between the control electrode 19 and cathode 20 of tube 18 is the difference between the values of curve A and of the relatively constant value of cathode bias $E_K$. Therefore, when the potential at the point P becomes larger than the cutoff bias $E_0$ at time $t_1$, anode current is initiated in the vacuum tube 18. During the interval $t_0-t_1$ when the vacuum tube 18 is biased to cutoff, the resonant circuit comprising the transformer winding 21 and condenser C has a positive value of conductance as represented by the solid-line curve D, and high-frequency oscillations previously developed in the resonant circuit prior to time $t_0$ die away exponentially in amplitude during interval $t_0-t_1$, as represented by solid-line curve E.

As soon as anode current begins to flow in the vacuum tube 18 at time $t_1$, the regenerative coupling between the transformer windings 21 and 24 causes the input electrodes of the vacuum tube 18 to reduce the positive conductance of the resonant circuit 21, C in well-known manner and eventually causes this circuit to have a resultant negative conductance, as indicated by curve D. The amplitude of the high-frequency oscillations developed in the resonant circuit 21, C thereupon increases in an exponential manner with time and at time $t_2$ has such value as to cause the control electrode 19 of tube 18 to become conductive relative to its cathode 20 during the positive peak portion of each oscillation. The control electrode 19 upon becoming conductive immediately reduces the potential at the point P of the oscillatory system to initiate a discharge pulse which travels down the delay network 26 toward its remote end. At the same time, the conductive condition of the control electrode reduces the conductance of the tuned circuit 21, C substantially to zero, as indicated by curve D, so that the amplitude of the oscillations developed in the latter no longer increases but remains at a substantially uniform amplitude level commonly called the "saturation" level. During the interval $t_1-t_2$ when the oscillations in the tuned circuit 21, C are building up to the saturation level, the anode current of the tube 18 slowly increases in value, as represented by curve F, but quickly increases at time $t_2$ to a maximum value limited by the high value of resistance of the resistor 25. The dischage pulse previously mentioned travels down the delay network 26 to its remote end where it is reflected without reversal of polarity and at time $t_3$ arrives back at the input terminals of the network. The potential at the point P thereupon suddenly drops to the value which it had at the time $t_0$ and in dropping causes the control electrode 19 to bias the vacuum tube 18 again to anode-current cutoff. This terminates one cycle of operation of the oscillatory system and initiates a new cycle of the operation described.

In the operation of the oscillatory system, it is desirable that the oscillations developed in the resonant circuit 21, C "hang over" from one operating cycle of the system to the next. That is, the amplitude of the developed oscillations preferably should not decrease to zero during the interval $t_0-t_1$, but rather should have an amplitude value at time $t_1$ much larger than any noise disturbances which may exist in the oscillatory system. This ensures that the oscillatory build-up interval $t_1-t_2$ shall remain uniform from one cycle to the next, thereby to avoid slight variations in the value of this interval which otherwise would occur if the oscillations of the circuit 21, C had initial amplitudes varying in random fashion with the amplitude of transient noise disturbances. As is well known, oscillations developed in the resonant circuit 21, C have increasing hang-over amplitudes with increasing values of shunt circuit resistance and, hence, the hang-over characteristics may be controlled as desired by control of the high-frequency resistance of the inductor 21 and condenser C.

Assume now that the transconductance of the vacuum tube 18 suddenly increases for one reason or another. Upon the vacuum tube 18 becoming conductive at time $t_1$, its increased transconductance causes the tuned circuit 21, C to have a conductance changing more rapidly with time, as represented by broken-line curve D', so that the amplitude of the oscillations developed in the circuit also increases more rapidly with time, as represented by the broken-line curve E'. The saturation level of the developed oscillations is reached more quickly at time $t_2'$ so that the anode current now has a wave form as represented by broken-line curve F'. The duration of each anode pulse has the same value $t_2'-t_3'$ as in the condition first assumed since the pulse duration is controlled by the time delay of the network 26. Thus by virtue of the assumed increase of the transconductance of the vacuum tube 18, the oscillatory period of the oscillatory system is decreased by the time interval $t_3'-t_3$ so that the frequency of the generated oscillations of the system increases. This, of course, effects an increase of the average value of anode current of the vacuum tube 18 since there are now a larger number of anode-current pulses per unit of time. The increased value of average anode current increases the average bias potential developed across the cathode resistor 27 and condenser 28. The larger value of this bias potential, however, is effective to reduce the transconductance of the vacuum tube 18 substantially to the value which it had under the condition first assumed. When the transconductance is thus reduced, the oscillatory system has substantially the operation described with relation to the first assumed condition and represented by curves D, E and F of Fig. 2. Thus, the degenerative action of the cathode elements 27, 28 is effective to maintain the frequency of oscillation of the oscillatory system substantially constant with variations of the transconductance of the vacuum tube 18.

The following mathematical analysis of the oscillatory-system operation will render more clear the reason for its high operating stability.

It is apparent that the normal operating bias $E_{K-g}$ between the control electrode and cathode of the tube 18 during the oscillatory build-up interval $t_1-t_2$ is given by the relation $$E_{K-g}=E_K-E_g \tag{1}$$

where $$E_g=K_1E_B \tag{2}$$

($K_1$ is an arbitray constant related to the values of the resistors 29 and 30)

$E_B$=the value of the energizing potential +B $$E_K=R_Ki_{av} \tag{3}$$

$R_K$=the value of the cathode resistor 27

$i_{av}$=the average value of anode current of tube 18

It is also apparent that the peak value of anode current of the vacuum tube 18 is given by the relation $$i_p\cong\frac{E_B-E_K}{R} \tag{4}$$

where

R=the value of resistance of the resistor 25

The average value of anode current $i_{av}$ of the tube 18 may be expressed by the relation $$i_{av}=i_p\times\frac{t_d}{t_r} \tag{5}$$

where $t_d$=the pulse duration of the anode-current pulses as established by the delay network 26

$t_r$=the oscillatory period of the oscillatory system

Re-arranging Equation 5:

$$t_r=\frac{i_p}{i_{av}}\times t_d \tag{6}$$

When Equations 1, 2 and 3 are combined with Equation 6 it can be shown that the following relation prevails:

$$t_r=i_p\times\frac{R_K}{K_1E_B+E_{K-g}}\times t_d \tag{7}$$

Now if Equations 4 and 7 are combined, and remembering that the quantity $E_{K-g}$ is much smaller than either the control electrode bias $E_g$ or the cathode potential $E_K$, it can be shown that the oscillatory period of the oscillatory system has the following value $$t_r\cong\frac{R_K}{R}\times\frac{1-K_1}{K_1}\times t_d \tag{8}$$

In Equation 8, the pulse duration $t_d$ is constant and established by the delay of the delay network 26. The fraction $K_1$ of the potential +B applied by the voltage divider 29, 30 to the control electrode 19 of tube 18 is also constant as also is the valut $R_K$ of the cathode resistor 27 and the value R of the resistor 25. It is consequently apparent that the oscillatory system has high frequency stability since its oscillatory period is established almost entirely by circuit elements of constant value.

Referring now to Equation 5, the anode-current pulse duration $t_d$ established by the delay network 26 has constant value and it will be apparent that the oscillatory period $t_r$ of the system is maintained constant with variations of operating conditions of the system if the average value $i_{av}$ varies in the same sense and proportionately with variations of the peak value $i_p$ of anode current of the tube 18. From Equations 2 and 3, assuming that $E_{K-g}$ is small compared to $E_K$ or $E_g$, the average value of anode current is given by the relation $$i_{av}\cong E_B\times\frac{K_1}{R_K} \tag{9}$$

It will be apparent from the latter equation and from Equation 4 that a selection of the value of the constant $K_1$ may be made which will maintain this desired relation between the average and the peak values of anode current with variations of the energizing potential +B. When this is done, the oscillatory system has good frequency stability for variations of the energizing potential +B as well as for variations of transconductance of tube 18 as earlier described.

It is apparent from the foregoing described operation of the oscillatory system that it possesses good frequency stability against variations of the usual operating conditions to which the system is normally subjected in operation. It is further apparent that the transconductance of the vacuum tube 18 controls the oscillatory period of the system in the absence of the stabilizing action of the cathode resistor 27 and condenser 28, but that the degenerative effect of the latter elements so controls the transconductance of the tube 18 by control of its average current and in such a direction as to degenerate the effect of variations of transconductance of this tube. For this purpose, and as indicated more particularly in Fig. 2, the value of the resistor 27 is preferably selected so large that the value of cathode potential $E_K$ developed from the average value of the anode current of the tube 18 is very much larger than the cutoff bias of this tube.

The phase-control tube 32 is responsive to the unidirectional phase-control signal developed in the output circuit of the phase-control system 13 to vary the impedance between its anode 35 and cathode 34. Since the latter impedance is in parallel with the resistor 30 of the potential divider 29, 30, variations of anode-cathode impedance of the tube 32 are effective to vary the value of the positive bias potential applied from the potential divider to the control electrode 19 of the tube 18. Reference to Equation 8 above shows that the phase-control tube 32 in varying the quantity $K_1$ is effective to vary the oscillatory period of the oscillatory system. The oscillations generated by the generator 15 are applied to the field-scanning generator 16 and are effective to synchronize the operation of the latter. The signal generated by the generator 16 is applied to the phase-control system 13 to develop in the output circuit of the latter a phase-control signal whenever the phase of the signal of the generator 16 departs from synchronization with the field-synchronizing signal applied from the receiver 10 to the unit 13. It will therefore be apparent that the operation of the phase-control tube 32 in its control over the periodicity of the generator 15 is effective to maintain the desired phase synchronization between the output signal of the generator 16 and the field-synchronizing signal of a received television signal.

The generator $15_a$ is essentially similar to the generator 15 and includes similar circuit elements, identified by similar reference numerals with the subscript *a*, except that the periodicity of the oscillations generated by the generator $15_a$ is that of the much higher frequency line-scanning signal. By way of illustrating the several different manners in which the periodicity of a signal generator embodying the present invention may be adjusted to a desired value, as by the use of a phase-control tube, the phase-control tube $32_a'$ of the generator $15_a$ is shown with its anode $35_a$ and cathode $34_a$ coupled across the cathode resistor $27_a$. The phase-control signal developed in the output circuit of the phase-control system 14 thus is effective to vary the effective resistance in the cathode circuit of the tube $18_a$. This is a variation of the quantity $R_K$ of Equation 8 from which it will be apparent that the phase-control tube $32_a'$ again is effective to vary the periodicity of the generator $15_a$. The operation of the generator $15_a$ is otherwise essentially similar to that of the generator 15 and will not be repeated.

From the above description of the invention, it will be apparent that a signal generator embodying the invention has the advantages that it is characterized in operation by exceptionally good frequency stability and is one particularly suitable for a phase-controlled operation as in a scanning system of a television receiver. The generator of the present invention has the additional advantages that it possesses very stable operating characteristics over a wide range of variations of operating conditions to which the generator is normally subjected in operation, yet is of simple and inexpensive arrangement involving a minimum of circuit components.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A signal generator comprising, an oscillatory system for generating oscillations, said system including an energizing circuit in which the energizing current thereof is effectively of repeated-pulse wave form, means for maintaining substantially constant the durations of the pulses of said current and for limiting the amplitudes thereof, and means responsive to the unidirectional component of said current yet having much less response to the pulse-periodicity component thereof for controlling said oscillatory-system periodicity by maintaining a controlled relationship between the average value of said current and the average value of energizing potential of said energizing circuit, thereby to maintain substantially constant the average periodicity of said generated oscillations.

2. A signal generator comprising, an oscillatory system for generating oscillations, said system including an energizing circuit in which the energizing current thereof is effectively of repeated-pulse wave form, means for maintaining substantially constant the durations of the pulses of said current and for limiting the amplitudes thereof, and a time-constant network responsive to said current and having a time constant short with relation to undesired variations of the unidirectional component thereof yet long with relation to the pulse-periodicity component thereof for controlling said oscillatory system to maintain a controlled relationship between the average value of said current and the average value of energizing potential of said energizing circuit, thereby to maintain substantially constant the periodicity of said generated oscillations.

3. A signal generator comprising, an oscillatory system for generating oscillations, said system including a controllable-transconductance vacuum tube and an energizing circuit therefor in which the energizing current thereof is effectively of repeated-pulse wave form, means for maintaining substantially constant the durations of the pulses of said current and for limiting the amplitudes thereof, and means responsive to the unidirectional component of said current yet having much less response to the pulse-periodicity component thereof for deriving a control bias effective to control the transconductance of said tube to maintain a controlled relationship between the average value of said current and the average value of energizing potential of said energizing circuit, thereby to maintain substantially constant the periodicity of said generated oscillations.

4. A signal generator comprising, an oscillatory system for generating oscillations, said system including an energizing circuit in which the energizing current thereof is effectively of repeated-pulse wave form, means for maintaining substantially constant the durations of the pulses of said current and for limiting the amplitudes thereof, means responsive to the unidirectional component of said current yet having much less response to the pulse-periodicity component thereof for controlling said oscillatory system to maintain a controlled relationship between the average value of said current and the average value of energizing potential of said energizing circuit, thereby to maintain substantially constant the periodicity of said generated oscillations, and means for adjusting said current-potential relationship to adjust to a desired value the periodicity of said generated oscillations.

5. A signal generator comprising, an oscillatory system for generating oscillations, said system including a controllable-transconductance vacuum tube and an energizing circuit therefor in which the energizing current thereof is effectively of repeated-pulse wave form, means for maintaining substantially constant the durations of the pulses of said current and for limiting the amplitudes thereof, means responsive to the unidirectional component of said current yet having much less response to the pulse-periodicity component thereof for deriving a control bias effective to control the transconductance of said tube to maintain a controlled relationship between the average value of said current and the average value of energizing potential of said energizing circuit, thereby to maintain substantially constant the periodicity of said generated oscillations, and means for adjusting the value of a second bias of said tube to vary said current-potential relationship to adjust to a desired value the periodicity of said generated oscillations.

6. A signal generator comprising, a regenerative system having input and output circuits regeneratively coupled to generate oscillations, the output-circuit current of said system being effectively of repeated-pulse wave form, means for maintaining substantially constant the durations of the pulses of said current and for limiting the amplitudes thereof, and means responsive to the unidirectional component of said current yet having much less response to the pulse-periodicity component thereof for controlling said oscillatory system to maintain a controlled relationship between the average value of said current and the average value of energizing potential of said energizing circuit, thereby to maintain substantially constant the periodicity of said generated oscillations.

7. A signal generator comprising, an oscillatory system for generating oscillations, said system including an input circuit and an energizing circuit in which the energizing current thereof is effectively of repeated-pulse wave form, means for maintaining substantially constant the durations of the pulses of said current and for limiting the amplitudes thereof, and means common to said circuits and responsive to the unidirectional component of said current yet having much less response to the pulse-periodicity component thereof for deriving a control effect and for applying said control effect to said input circuit to maintain a controlled relationship between the average value of said current and the average value of energizing potential of said energizing circuit, thereby to maintain substantially constant the periodicity of said generated oscillations.

8. A signal generator comprising, an oscillatory system for generating oscillations, said system including an input circuit and an energizing circuit in which the energizing current thereof is effectively of repeated-pulse wave form, means for maintaining substantially constant the durations of the pulses of said current and for limiting the amplitudes thereof, and means common to said circuits and responsive substantially only to the unidirectional component of said current for deriving a unidirectional control potential and for applying said potential to said input circuit to maintain a controlled relationship between the average value of said current and the average value of energizing potential of said energizing circuit, thereby to maintain substantially constant the periodicity of said generated oscillations.

9. A signal generator comprising, an oscillatory system for generating oscillations, said system including an input circuit and an energizing circuit in which the energizing current thereof is effectively of repeated-pulse wave form, means for maintaining substantially constant the durations of the pulses of said current and for limiting the amplitudes thereof, and a resistor and parallel-connected condenser common to said circuits for degeneratively coupling said circuits with respect to the unidirectional component of said current yet providing no appreciable coupling between said circuits with respect to the pulse-periodicity component of said current for controlling said oscillatory system to maintain a controlled relationship between the average value of said current and the average value of energizing potential of said energizing circuit, thereby to maintain substantially constant the periodicity of said generated oscillations.

10. A signal generator comprising, an oscillatory system including a vacuum tube having input electrodes included in an input circuit and output electrodes included in an energizing circuit regeneratively coupled to said input circuit to generate oscillations, the energizing current of said energizing circuit being effectively of repeated-pulse wave form, means for maintaining substantially constant the durations of the pulses of said current and for limiting the amplitudes thereof, a resistive-capacitive network common to said circuits and responsive to the unidirectional component of said current yet having much less response to the pulse-periodicity component thereof for developing from the average value of said current a bias potential for said input circuit much larger than that required therein to bias said tube to anode-current cutoff, and means responsive to the energizing potential of said energizing circuit for applying to said input circuit a bias potential having a value which provides with said first-mentioned bias potential a normal operating bias for said input circuit yet a resultant bias therefor which varies with the value of said energizing potential, thereby to maintain substantially constant the periodicity of said generated oscillations.

11. A signal generator comprising, an oscillatory system for generating oscillations, said system including an energizing circuit in which the energizing current thereof is effectively of repeated-pulse wave form, means for limiting the amplitudes of the pulses of said current, means for maintaining substantially constant the durations of the pulses of said current, and means responsive to the unidirectional component of said current yet having much less response to the pulse-periodicity component thereof for controlling said oscillatory system to maintain a controlled relationship between the average value of said current and the average value of energizing potential of said energizing circuit, thereby to maintain substantially constant the periodicity of said generated oscillations.

12. A signal generator comprising, an oscillatory system for generating oscillations, said system including an energizing circuit in which the energizing current thereof is effectively of repeated-pulse wave form, means for limiting the amplitudes of the pulses of said current, means responsive to the initiation of each pulse of said current for terminating said each pulse after a predetermined fixed time interval to maintain substantially constant the durations of said current pulses, and means responsive to the unidirectional component of said current yet having much less response to the pulse-periodicity component thereof for controlling said oscillatory system to maintain a controlled relationship between the average value of said current and the average value of energizing potential of said energizing circuit, thereby to maintain substantially constant the periodicity of said generated oscillations.

13. A signal generator comprising, an oscillatory system for generating oscillations, said system including an energizing circuit in which the energizing current thereof is effectively of repeated-pulse wave form, means for limiting the amplitudes of the pulses of said current, a delay network responsive to the initiation of each pulse of said current for terminating said each pulse after a predetermined fixed time interval established by said network to maintain substantially constant the durations of said current pulses, and means responsive to the unidirectional component of said current yet having much less response to the pulse-periodicity component thereof for controlling said oscillatory system to maintain a controlled relationship between the average value of said current and the average value of energizing potential of said energizing circuit, thereby to maintain substantially constant the periodicity of said generated oscillations.

14. A signal generator comprising, an oscillatory system including a vacuum tube having anode and cathode electrodes coupled to an energizing circuit and input electrodes coupled to an input circuit for generating oscillations, said tube in its conductive state having a relatively low value of anode-to-cathode impedance and the energizing current of said energizing circuit being effectively of repeated-pulse wave form, a resistive impedance included in said energizing circuit and having a value of impedance much larger than said anode-cathode impedance for limiting the amplitudes of the pulses of said current, means for maintaining substantially constant the durations of the pulses of said current, and means responsive to the unidirectional component of said current yet having much less response to the pulse-periodicity component thereof for controlling said oscillatory system to maintain a controlled relationship between the average value of said current and the average value of energizing potential of said energizing circuit, thereby to maintain substantially constant the periodicity of said generated oscillations.

BERNARD D. LOUGHLIN.

REFERENCES CITED

The following references are of record in the file of this patent:

UNITED STATES PATENTS

| Number | Name | Date |
|---|---|---|
| 2,165,770 | Tolson | July 11, 1939 |
| 2,344,810 | Fredendall | Mar. 21, 1944 |